US007943241B2

(12) United States Patent
Kurokawa et al.

(10) Patent No.: US 7,943,241 B2
(45) Date of Patent: May 17, 2011

(54) COMPOSITE CERAMIC BODY

(75) Inventors: Junji Kurokawa, Higashiomi (JP);
Kazutsugu Kobayashi, Higashiomi (JP); Motoaki Yoshida, Higashiomi (JP);
Masahiro Okumura, Higashiomi (JP);
Atsushi Ogasawara, Higashiomi (JP);
Tetsurou Abumita, Higashiomi (JP);
Takeshi Ogawa, Higashiomi (JP);
Masakazu Yasui, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 835 days.

(21) Appl. No.: 11/720,282

(22) PCT Filed: Nov. 29, 2005

(86) PCT No.: PCT/JP2005/021899
§ 371 (c)(1),
(2), (4) Date: Nov. 20, 2007

(87) PCT Pub. No.: WO2006/057408
PCT Pub. Date: Jun. 1, 2006

(65) Prior Publication Data
US 2008/0305005 A1    Dec. 11, 2008

(30) Foreign Application Priority Data

Nov. 29, 2004 (JP) ................ 2004-344942
Nov. 29, 2004 (JP) ................ 2004-344943
Sep. 28, 2005 (JP) ................ 2005-283010

(51) Int. Cl.
*B32B 9/04*     (2006.01)
*B32B 13/04*    (2006.01)
*G11B 11/105*   (2006.01)

(52) U.S. Cl. ............. 428/448; 428/332; 428/446
(58) Field of Classification Search ........ 428/332, 428/446, 448
See application file for complete search history.

(56) References Cited

U.S. PATENT DOCUMENTS

| 5,441,803 A | 8/1995 | Meissner | 428/220 |
| 5,867,359 A * | 2/1999 | Sherman | 361/234 |

FOREIGN PATENT DOCUMENTS

| JP | 02-153849 | 6/1990 |
| JP | 04-283957 | 10/1992 |
| JP | 04-295078 | 10/1992 |
| JP | 07-220923 | 8/1995 |

(Continued)

OTHER PUBLICATIONS

Binner et al., "The effect of composition on the microwave bonding of alumina ceramics", Journal of Materials Science vol. 33, No. 12, (1998), pp. 3017-3029.*

(Continued)

*Primary Examiner* — Jennifer C McNeil
*Assistant Examiner* — Jonathan C Langman
(74) *Attorney, Agent, or Firm* — DLA Piper LLP (US)

(57) ABSTRACT

A composite ceramic body and a method thereof are provided. The composite ceramic body comprising a first bonding body comprising a ceramic containing Si ingredient, and a second bonding body bonded to the first bonding body through a bonding material containing, as main ingredient, a Si compound which includes the element common to the Si ingredient contained in the first bonding body. The first and second bonding bodies can be bonded strongly and uniformly without any adhesive. Since the composite ceramic body has high bonding strength, it is applicable to microchemical chips and reformers.

2 Claims, 8 Drawing Sheets

FOREIGN PATENT DOCUMENTS

| | | |
|---|---|---|
| JP | 09-208399 | 8/1997 |
| JP | 2000-143363 | 5/2000 |
| JP | 2001-122697 | 5/2001 |
| JP | 2002-097040 | 4/2002 |
| JP | 2003-048783 | 2/2003 |
| JP | 2003-128473 | 5/2003 |
| JP | 2004-059402 | 2/2004 |
| WO | WO 00/37720 | 6/2000 |

OTHER PUBLICATIONS

Zeng et al. ("The interfacial microstructure of joined single crystal and polycrystalline alumina", Materials Science and Engineering A, vol. 360, (2003), pp. 228-236.*

* cited by examiner (a)

(b)

(c)

(a)

(b)

50 μm (a)

(b)

(a)

(b)

(c)

COMPOSITE CERAMIC BODY

TECHNICAL FIELD

The present invention relates to a composite ceramic body formed by bonding a similar or dissimilar bonding body to a bonding body comprising a ceramic, and a method of manufacturing the composite ceramic body, as well as a microchemical chip and a reformer, each using the composite ceramic body. More particularly, the invention relates to a composite ceramic body in which a bonding body composed of sapphire is bonded to a bonding body composed of alumina ceramics.

BACKGROUND ART

Conventionally, there has been proposed a variety of composite ceramic bodies formed of a first bonding body comprising a ceramic, and a second bonding body composed of other ceramics which is bonded to the first bonding body with an intermediate layer in between.

As the intermediate layer, aluminium, silver, gold, platinum, or alloys of these metals have been used. By coating a metallic brazing filler metal to the above-mentioned bonding bodies and/or the intermediate layer, a stacked body is formed and then heat-treated to obtain a composite ceramic body (refer to patent literature 1).

As a composite ceramic body using a bonding body composed of alumina ceramics, there has been proposed a composite ceramic body in which bonding bodies are bonded to each other with an intermediate layer in between. The bonding bodies are composed of alumina ceramics containing a YAG composition and having an alumina-YAG graded layer in which the ratio of the YAG composition is increased from the inside to the surface. In a method of manufacturing the composite ceramic body, granuled power composed of alumina and a predetermined amount of a yttrium compound are formed to obtain formed bodies. The formed bodies are sintered at 1600 to 1850° C. with their respective bonding parts superposed, resulting in the composite ceramic body. Alternatively, the above-mentioned formed bodies are calcinated at 800 to 1300° C., to obtain calcinated bodies. The calcinated bodies are sintered at 1600 to 1850° C. with their respective bonding parts superposed, resulting in the composite ceramic body (refer to patent literature 2).

As a composite ceramic body of ceramic sintered bodies having substantially the same composition, there has been proposed a ceramic sintered body in which a bonding layer contains 90 weight % of the component composition of the ceramic sintered bodies. The composite ceramic body has a thickness of 50 to 500 μm (refer to patent literature 3).

There has also been proposed that the ratio of the mean crystal grain size of a ceramic sintered body and the mean crystal grain size of a ceramic sintered body constituting a bonding layer is 0.5 to 2.0. There are the following descriptions. In a method of manufacturing these composite ceramic bodies, ceramic formed bodies prior to sintering, having substantially the same ceramic component composition, are bonded with a ceramic-based slurry adhesive, followed by sintering. Here, it is suitable to use the ceramic-based slurry adhesive in which the component composition of ceramic particles in the ceramic-based slurry contains 90 weight % or more of ceramic composition constituting the ceramic formed bodies, having a mean particle size of 1.0 μm or less, and has a water content of 5 to 25 weight %.

There has also been proposed a composite ceramic body formed by bonding bodies composed of low thermal expansion ceramics with an intermediate layer in between. The intermediate layer is composed of low thermal expansion ceramics having a lower melting temperature than the bonding bodies. In this composite ceramic body, only the intermediate layer can be melted during the time of bonding, thereby to bond a plurality of bonding bodies to each other. Further, since the intermediate layer is the low thermal expansion ceramics, the stress remaining in bonding surfaces is small and the rigidity of the bonding surfaces is high. Therefore, the rigidity of the entire composite ceramic body can be increased, and the strength of the bonding surfaces themselves can be increased (refer to patent literature 4).

In a method of bonding synthetic corundums, it has been proposed to obtain bonding by superposing the polished bonding surfaces of two synthetic corundums to bring one end part into an adhesion state, and bonding in this state at a temperature not above the melting point of the synthetic corundums (1100 to 1800° C.). It is described that higher bonding strength is attainable by controlling the flatness of the bonding surfaces of the above-mentioned synthetic corundums to a range of 1/2 to 1/6 of the wavelength λ of red light (refer to patent literature 5).

As a method of bonding silicon-oxide-based members, there has been proposed a method of bonding two silicon-oxide-based members by exposing them to hydrofluoric acid gas and then bringing them into contact with each other. There are the following descriptions. In this bonding method, the two silicon-oxide-based members are placed at opposite positions, and hydrofluoric acid gas is filled in between, so that the hydrofluoric acid gas is adsorbed on the respective surfaces of the silicon-oxide-based members, and the bonding between atoms are cut, resulting in chemically active. That is, hydrofluoric acid gas is the vapor of hydrofluoric acid generated when hydrofluoric acid (HF) is dissolved in water ($H_2O$), and hydrofluoric acid is dissolved in water and then ionized. Subsequently, hydrofluoric acid gas is adsorbed on the surfaces of the silicon-oxide-based members, and the siloxane bonding of the silicon-oxide-based members is cut, resulting in chemically active. The silicon-oxide-based members are then brought into contact with each other, so that two chemically active surfaces are connected and bonded to each other (refer to patent literature 6).

In the above-mentioned composite ceramic bodies in patent literatures 1 to 4, there is the following problem. That is, when the intermediate layer is formed in advance between the bonding bodies, and brought into contact with each other and then heat-treated, variations at the time of forming can be reflected thereby to cause variations in the thickness of the intermediate layer.

On the other hand, in the case of bonding a mono-crystalline such as sapphire and the ceramic body, as in patent literatures 6 and 7, there is the problem that the reaction of bonding interface is induced thereby to impair mechanical and electrical characteristics possessed by nature.

In the composite ceramic body in which the adhesive is disposed in the intermediate layer, because high temperature processing is required in use, reliability may be a problem when this is used in a manufacturing process and high temperature atmosphere. The composite ceramic body by means of molten deposition has the problem that dimensional accuracy is liable to be lowered because heat-treated fused powder is bonded by high-pressure spraying in the manufacturing process. Additionally, in the bonding using electrical energy, the bonding between chrome or silicon and glass is attained by the application of voltage. The bonding with crystals cannot be attained without the presence of a metal film or the like, it is limited to a temperature range where a material to be bonded cannot be dissolved. Hence, an upper limit of the operating temperature range is imposed.

With this in view, a composite ceramic body has been proposed in which a main surface of a bonding body is processed for direct bonding, without using any intermediate layer composed of adhesive or the like. For example, as an electronic part used in a device, a magnetic substrate and a retention substrate which is brought into a direct bonding with the magnetic substrate by at least one of hydrogen bond and covalent bond have been proposed (refer to patent literature 7). There are the following descriptions. The term "direct bonding" is defined as bonding which can be formed on the substrate by hydrogen bond or covalent bond, without using other material such as adhesive. The formation of the direct bonding is obtained as follows. Firstly, the surface of at least one of the magnetic substrate and the retention substrate is subject to hydrophilization process in order to introduce hydroxyl groups into the substrate surface. Then, when the surfaces having sufficient hydroxyl groups are superposed, the two substrates can be bonded by hydrogen bond between hydroxyl groups or through adsorbed water molecules. By heat treatment of the bonded substrates, the water molecules and hydrogen can be released from the bonding interface, and hydrogen bond can be shifted to covalent bond, thereby increasing bonding strength. The heat treatment temperature in the direct bonding is set to 200 to 800° C.

A similar bonding body as a crystal element has also been proposed. That is, crystal wafers are mirror-polished and bonding surfaces are subject to hydrophilization process (OH group conversion). Further, after the crystal wafers are brought into contact with each other, the OH groups on the interface are removed by heat treatment, so that bonding can be obtained by Si—O—Si bonding (interatomic bonding) (refer to patent literature 8).

In the above-mentioned direct bonding, as shown in FIGS. 9(a) to 9(c), when the surface of a first bonding body 21 and the surface of a second bonding body 22 are subject to hydrophilization process, a large number of water molecules and OH groups can be adsorbed on the surface of the first bonding body 21 and the surface of the second bonding body 22.

When in this state, the first bonding body 21 and the second bonding body 22 are brought into contact with each other, the initial bonding between the first and second bonding bodies 21 and 22 by hydrogen bond through water molecules, OH group, or the like can be formed (FIG. 9(a)). Subsequently, when these are heat-treated, dehydration or hydrogen release occurs gradually from the bonding interface, thereby enhancing the bonding (FIG. 9(b)). The increased strength may result from the fact that the dominant bonding of direct bonding is shifted from hydrogen bond through water molecules, to hydrogen bond between OH groups without through water molecules (FIG. 9(c)). This state can be often observed when heat treatment is carried out at temperature of 200 to 500° C. For attaining strong bonding, heat treatment temperature is set in consideration of the coefficient of thermal expansion and the shape (dimension) of materials to be bonded. Specifically, the heat treatment is carried out at temperatures of 200 to 800° C.

Patent literature 1: Japanese Unexamined Patent Publication No. 2000-143363
Patent literature 2: Japanese Unexamined Patent Publication No. 2003-48783
Patent literature 3: Japanese Unexamined Patent Publication No. 2003-128473
Patent literature 4: Japanese Unexamined Patent Publication No. 2004-59402
Patent literature 5: the pamphlet of WO 00/37720
Patent literature 6: Japanese Unexamined Patent Publication No. 2002-97040
Patent literature 7: Japanese Unexamined Patent Publication No. 7-220923
Patent literature 8: Japanese Unexamined Patent Publication No. 2001-122697

DISCLOSURE OF THE INVENTION

Problems to be Solved by the Invention

Although the direct bonding, as disclosed in patent literatures 7 and 8, is formed mainly by covalent bond between the oxygen element existing on the bonding surface and the surface of the bonding body, the problem of bonding strength still persists. In particular, when airtightness is required, the direct bonding is susceptible to the influence of the surface shapes of the first and second bonding bodies 21 and 22. This leads to the problem that no bonding may be formed partially. There is a limitation of materials to be selected because cracks occur from the bonding interface depending on a difference in coefficient of thermal expansion between the first and second bonding bodies 21 and 22.

Further, the heat treatment temperature at the time of bonding is 200 to 800° C., and the covalent bond that becomes an intermediate layer is formed in this temperature range. Therefore, if used under environment of higher temperature than that, the bonding surface in the bonding body cannot retain high temperature thermal characteristic.

Accordingly, the present invention has for its object to provide a composite ceramic body having high bonding strength and a method of manufacturing the composite ceramic body, as well as a microchemical chip and a reformer.

Means for Solving the Problems

The present inventors have made tremendous research effort to solve the above-mentioned problems, and have made the present invention based on the following means for solving. Specifically, the present invention has the following configurations.

(1) A composite ceramic body comprising a first bonding body comprising a ceramic containing Si ingredient, and a second bonding body bonded to the first bonding body through a bonding material containing, as main ingredient, a Si compound which includes the element common to the Si ingredient contained in the first bonding body.

(2) The composite ceramic body as set forth in the above (1), in which the bonding material is composed mainly of a Si compound eluted from the first bonding body.

(3) The composite ceramic body as set forth in the above (1), in which a Si concentration in the first bonding body decreases toward a bonding surface.

(4) The composite ceramic body as set forth in the above (1), in which the second bonding body comprises a ceramic containing Si ingredient.

(5) The composite ceramic body as set forth in the above (4), in which the bonding material is composed mainly of a Si compound eluted from the first bonding body and the second bonding body.

(6) The composite ceramic body as set forth in the above (4), in which a Si concentration in at least one of the first bonding body and the second bonding body decreases toward a bonding surface.

(7) The composite ceramic body as set forth in the above (1), in which the second bonding body comprises sapphire.

(8) The composite ceramic body as set forth in the above (7), in which a bonding surface of the second bonding body comprising sapphire is c-plane.

(9) The composite ceramic body as set forth in the above (7), in which at least part of the bonding surface of the second bonding body comprising sapphire has a step-terrace structure.

(10) The composite ceramic body as set forth in the above (9), in which a step height of the step-terrace structure is 0.2 nm or more.

(11) A method of manufacturing a composite ceramic body by bonding a second bonding body to a first bonding body comprising a ceramic containing Si ingredient. The method includes the step of polishing at least a surface used as a bonding surface of each of the first bonding body and the second bonding body; the step of bringing the polished bonding surfaces of the first and second bonding bodies into contact with each other; and the step of heat treatment for bonding the first and second bonding bodies being in contact with each other.

(12) The method of manufacturing a composite ceramic body as set forth in the above (11), in which a temperature of the heat treatment is lower than a sintering temperature of the first bonding body and the second bonding body.

(13) A method of manufacturing a composite ceramic body by bonding a second bonding body to a first bonding body comprising a ceramic containing Si ingredient. The method includes the step of hydrophilization process with a liquid having OH groups, on at least one of surfaces used as bonding surfaces of the first and second bonding bodies, respectively; the step of bringing the first bonding body and the second bonding body into contact with each other; and the step of heat treatment for bonding at 1000 to 1800° C.

(14) A microchemical chip comprising a composite ceramic body as set forth in the above (1), in which a bonding surface of the first bonding body or a bonding surface of the second bonding body is provided with a channel.

(15) A reformer comprising a composite ceramic body as set forth in the above (1), in which a bonding surface of the first bonding body and a bonding surface of the second bonding body are provided with a channel having a catalyst layer and a heating element for heating the catalyst layer.

(16) A reformer comprising a composite ceramic body as set forth in the above (1), in which at least one of a bonding surface of the first bonding body and a bonding surface of the second bonding body is provided with a channel having a catalyst layer and a heating element for heating the catalyst layer.

EFFECTS OF THE INVENTION

In accordance with the above (1) to (3), the composite ceramic body comprising a first bonding body comprising a ceramic containing Si ingredient, and a second bonding body bonded to the first bonding body through a bonding material containing, as main ingredient, a Si compound which includes the element common to the Si ingredient contained in the first bonding body. This enables to attain a bonding body of high bonding strength and a nearly inconspicuous bonding interface.

In accordance with the above (4) or (5), the second bonding body is a ceramic containing Si ingredient, and therefore Si ingredient can be eluted from both of the first and second bonding bodies to the bonding surface. This enables bonding through a larger amount of Si ingredient, thereby obtaining strong bonding.

In accordance with the above (6), the Si concentration in at least one of the first bonding body and the second bonding body decreases toward a bonding surface. Therefore, the bonding material formed by the elution of a larger amount of Si ingredient can be generated on the bonding surface. Through this bonding material, the first and second bonding bodies are bonded thereby to further increase the bonding strength and also suppress fracture and crack in the bonding surface.

In accordance with the above (7), the second bonding body comprises sapphire, and high transparency and high thermal conductivity can be utilized for the application as an optical element.

In accordance with the above (8), the bonding surface of the second bonding body comprising sapphire is the c-plane and hence has less anisotropy in coefficient of thermal expansion than sapphire of other surface orientation. This enables suppression of peeling, fracture, and crack of the bonding bodies due to a difference in coefficient of thermal expansion between the bonding bodies.

In accordance with the above (9), at least part of the bonding surface of the second bonding body comprising sapphire has the step-terrace structure. This enables an increase in the surface area of the bonding surface, and also an increase in the adhesion to the bonding material, thereby increasing the bonding strength.

In accordance with the above (10), the step height of the step-terrace structure is 0.2 nm or more, thus enabling bonding strength to be further increased.

In accordance with the above (11), the entire area of the polished bonding surfaces are bonded to each other with the bonding material composed mainly of the Si ingredient eluted from the first bonding body. This provides a composite ceramic body, whose bonding part is extremely thin and uniform, having high dimensional precision.

In accordance with the above (12), the heat treatment temperature is lower than the sintering temperature of the first bonding body and the second bonding body. This prevents the sintering of the bonding bodies from being excessively advanced and then deformed. It is therefore possible to obtain bonding, while retaining the profile irregularity of the bonding bodies before bonding.

In accordance with the above (13), at least one of the surfaces used as bonding surfaces of the first and second bonding bodies is subject to hydrophilization process with the liquid having OH groups, and the first bonding body and the second bonding body are brought into contact with each other, followed by heat treatment for bonding at 1000 to 1800° C. It is therefore easy to obtain a composite ceramic body whose bonding interface is extremely thin.

In accordance with the above (14), a microchemical chip bonded through an extremely thin bonding material can be manufactured. When this is used to induce a chemical reaction, the ingredient of the bonding material is hardly eluted, thereby achieving a microchemical chip minimizing the elution of impurities due to deterioration of the bonding material. It is therefore possible to induce a high precision chemical reaction. Because of the composite ceramic body, it is capable of providing a microchemical chip unsusceptible to corrosion even if used a chemical substance having extremely strong corrosivity such as strong acid, strong alkali, or fluoride.

In accordance with the above (15) or (16), because the bonding material is composed of the Si compound and has high bonding strength, the reformer is usable under high temperature environment, and also usable if the pressure within the reformer is further increased. This permits manufacturing of a high-efficiency reformer.

PREFERRED EMBODIMENTS FOR CARRYING OUT THE INVENTION

<Composite Ceramic Body>

Figure 1:
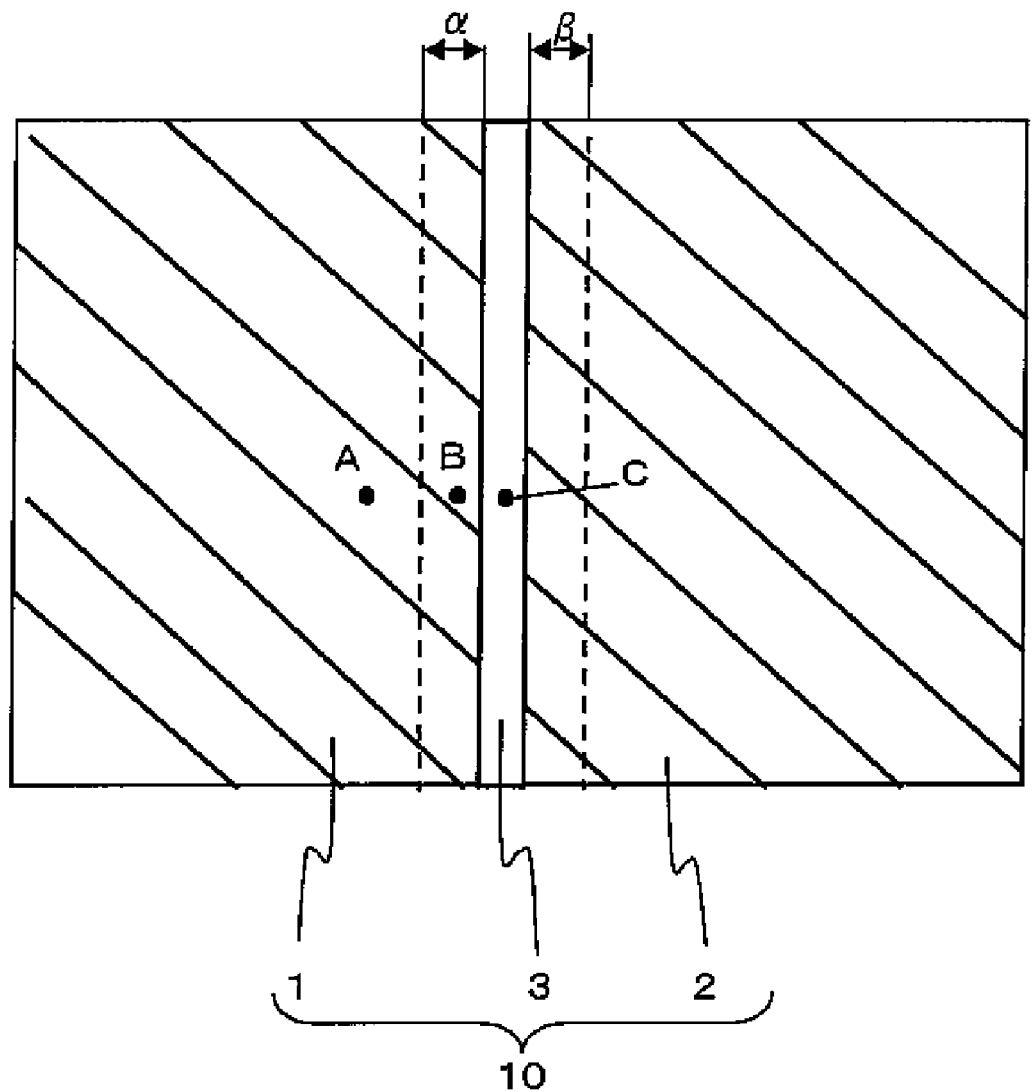
FIG. 1 is an enlarged sectional view showing the vicinity of a bonding part of a composite ceramic body according to an embodiment of the present invention.

An embodiment of a composite ceramic body according to the present invention will be described in detail with reference to the accompanying drawings. FIG. 1 is an enlarged sectional view showing the vicinity of a bonding part of a composite ceramic body according to the present embodiment. As shown in FIG. 1, the composite ceramic body 10 comprising a first bonding body 1 comprising a ceramic containing Si ingredient, and a second bonding body 2 bonded to the first bonding body 1 through a bonding material 3 containing, as main ingredient, a Si compound which includes the element common to the Si ingredient contained in the first bonding body 1. The expression that the bonding material 3 is composed mainly of the Si compound means containing of 50 mass % or more of the Si compound. In particular, it is preferable to contain 70 mass % or more.

Specifically, the bonding between the first bonding body 1 and the second bonding body 2 can be obtained in the following manner that the Si ingredient contained in the first bonding body 1 is eluted onto the bonding surface with respect to the second bonding body 2, thereby forming the bonding material 3 composed mainly of the Si compound. This realizes the bonding of high adhesion without preparing adhesive or the like. Further, the bonding is formed through the bonding material 3 composed mainly of the Si compound eluted from the first bonding body 1, resulting in the composite ceramic body 10 whose bonding part is extremely thin and uniform, having high dimensional precision.

The first bonding body 1 comprising a ceramic containing Si ingredient can be selected from polycrystalline ceramics and single crystal ceramics each containing Si ingredient. Examples of the polycrystalline ceramics are ceramics containing Si ingredient, which is composed mainly of alumina, forsterite, steatite, cordierite, or zirconia. In particular, the composite ceramic body 10 having high bonding strength can be obtained by polycrystalline ceramics composed mainly of (containing 50 mass % or more) oxide, such as alumina base ceramics.

When the main component is non-oxide, the bonding strength can be increased using the first bonding body 1, the uppermost surface of which is oxidized before bonding. As a single crystal ceramics where the first bonding body 1 contains Si ingredient, there are, for example, crystal, langasite ($La_3Ga_5SiO_{14}$), silica bismas ($Bi_{14}Si_3O_{12}$), and emerald ($Be_3Al_2Si_6O_{16}$).

Here, the first bonding body 1 comprising a ceramic is specified as one containing Si ingredient, as described above. This is because the Si ingredient contained in the first bonding material 1 is eluted by heat treatment onto the bonding interface between the first bonding body 1 and the second bonding body 2, thereby forming the bonding material 3 composed mainly of a Si compound. As the Si ingredient, there is $SiO_2$ or the like. As the Si compound, there is $3Al_2O_3 \cdot 2SiO_2$ or the like.

Preferably, the concentration of the Si ingredient contained in the first bonding body 1 is 0.01 weight % or more. When it is less than 0.01 weight %, the amount of the Si ingredient eluted from the bonding interface between the first bonding body 1 and the second bonding body 2 during the time of bonding is insufficient and hence the bonding strength of the composite ceramic body 10 is lowered. Preferably, the concentration of the Si ingredient is 5 weight % or less. Over 5 weight %, more Si ingredient than necessary may be contained, which is unsuitable.

When the first bonding body 1 is polycrystalline ceramics, Si ingredient is preferably present in a grain boundary layer of the polycrystalline ceramics. Its existence in the grain boundary layer facilitates the elution of the Si ingredient onto the bonding interface between the first bonding body 1 and the second bonding body 2 during the time of heat treatment for bonding. This enables the Si ingredient to be functioned as the bonding material 3 having higher bonding strength. It is preferable that the Si ingredient is any one of oxide, carbide, boride, and nitride, or a complex of these, and the first bonding body 1 contains at least one type of Si ingredient, more preferably being glassy.

Although no special limitation is imposed on ingredients other than Si ingredient, when the Si ingredient is glassy, preferred are an element and its compound which can decrease the melting point thereof. By lowering the melting point of the glassy, the heat treatment temperature at the time of bonding can be set to a low value, thereby relaxing the residual stress onto the composite ceramic body 10. It is also preferable to be an element and its compound which can decrease the viscosity of the Si ingredient. By lowing the viscosity of the Si ingredient, the Si ingredient is susceptible to elution onto the bonding interface between the first bonding body 1 and the second bonding body 2 during the time of heat treatment. This facilitates the formation of the bonding material 3, and also enables a reduction in heat treatment time. Consequently, as a ingredient other than the Si ingredient, there may be contained a magnesium compound, a calcium compound, a sodium compound, potassium compound, a boron compound, a lead compound, a compound of these, or the like.

The second bonding body 2 can be selected from polycrystalline ceramics, single crystals, and metals. It is not always required to contain Si ingredient in the second bonding body. It is however preferable that the second bonding body 2 also comprising a ceramic containing Si ingredient, in order to increase bonding strength. In this case, the Si ingredient can be eluted from both of the first and second bonding bodies 1 and 2 onto the bonding surfaces, and a sufficient amount of a Si compound can be present in between, thus providing the composite ceramic body 10 having higher bonding strength.

When the second bonding body 2 also comprising a ceramic containing Si ingredient, the concentration of the Si ingredient contained in the first bonding body 1 and the second bonding body 2, respectively, may be 0.005 weight % or more. This is sufficient for obtaining bonding because the Si ingredient can be eluted from both of the first and second bonding bodies. In this case, the concentration of the Si ingredient for each body is preferably 5 weight % or less.

Although the first bonding body 1 and the second bonding body 2 may be either dense or porous, these are preferably dense from the viewpoint of high strength and a large bonding area. No special limitation is imposed on the shape of these bodies. There are, for example, plate-shape or block-shape.

The broken lines in FIG. 1 indicate the distributions of the concentration of Si within the first bonding body 1 and the second bonding body 2, respectively. In cases where the first and second bonding bodies 1 and 2 contain Si ingredient, $\alpha$ represents an area where the concentration of Si in the first bonding body 1 is low, and $\beta$ represents an area where the concentration of Si in the second bonding body 1 is low. Although the composite ceramic body 10 of the present invention has the structure that the first bonding body 1 and the second bonding body 2 and the bonding material 3 are stacked one upon another, apparent other layers ($\alpha$, $\beta$) can be formed between the first bonding body 1 and the bonding material 3, and between the second bonding body 2 and the bonding material 3, respectively, because the concentration of Si decreases toward the bonding surface in between the first and second bonding bodies 1 and 2 in the vicinity of the bonding surface. These $\alpha$ and $\beta$ layers correspond to the part where the Si ingredient is eluted from the first and second bonding surfaces 1 and 2 onto the bonding surfaces. Throughout the composite ceramic body 10, the concentration of Si is changed stepwise, namely, the inside has a high concentration, the vicinity of the bonding surface has a low concentration, and the bonding surface has a high concentration. Therefore, the generation of thermal stress can be relaxed by reducing a difference in thermal expansion between the first bonding body 1 and the bonding material 3, and a difference in thermal expansion between the second bonding body 2 and the bonding material 3. This can be considered as being the function of improving the bonding strength of the composite ceramic body 10, and also suppressing fracture and crack.

In the composite ceramic body 10 of the present invention, it is preferable that the concentration of Si of the first bonding body 1 or the second bonding body 2 decreases toward the bonding surface.

Figure 2:
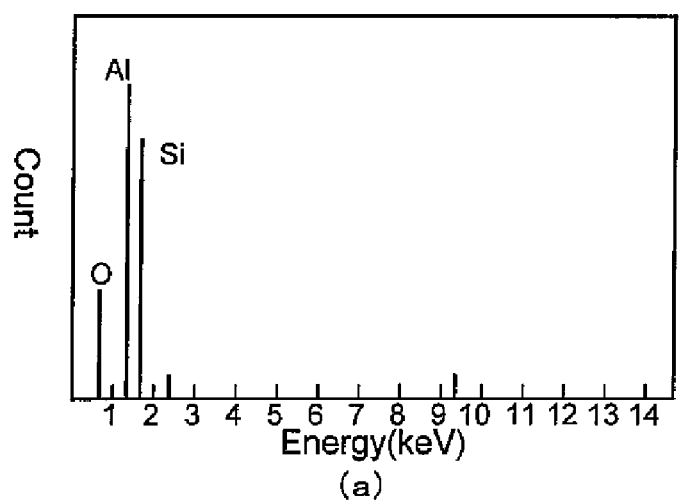
FIGS. 2(a) to 2(c) are graphs showing the results of component analysis on points A to C in FIG. 1.
Figure 2:
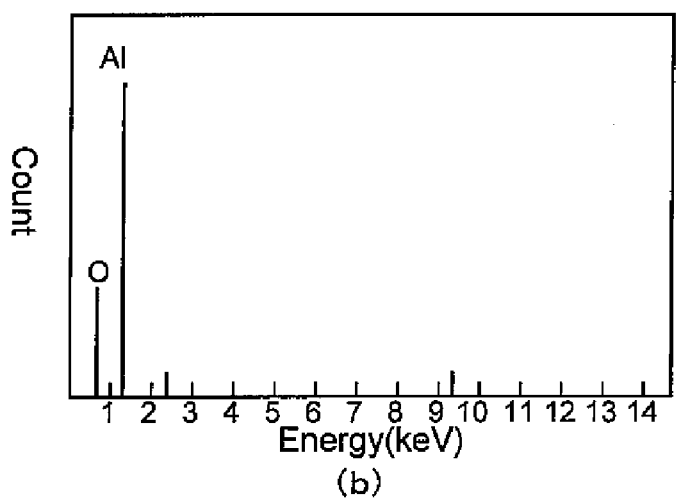
Figure 2:
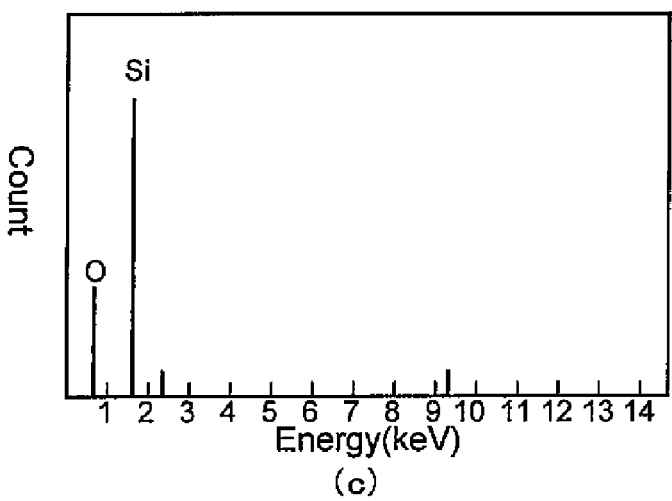

FIGS. 2(a) to 2(c) are graphs showing the results of component analysis on the positions corresponding to the points A, B, and C in FIG. 1, respectively, when both of the first and second bonding bodies 1 and 2 are composed of alumina ceramics. In the component analysis, after the bonding surface was examined under a transmission electron microscope (TEM), the qualitative analysis of elements was carried out by EDS analysis. As can be seen from FIGS. 2(a) to 2(c), the concentration of Si at the point B in the vicinity of the bonding surface is lowered with respect to the point A within the first bonding.

In the vicinity of the bonding surface of the composite ceramic body 10 of the present invention, the concentration of Si continuously decreases toward the bonding surface. The broken lines in FIG. 1 are for the sake of convenience. In either the first bonding body 1 or the second bonding body 2, the concentration of Si may decreases toward the bonding surface.

Figure 3:
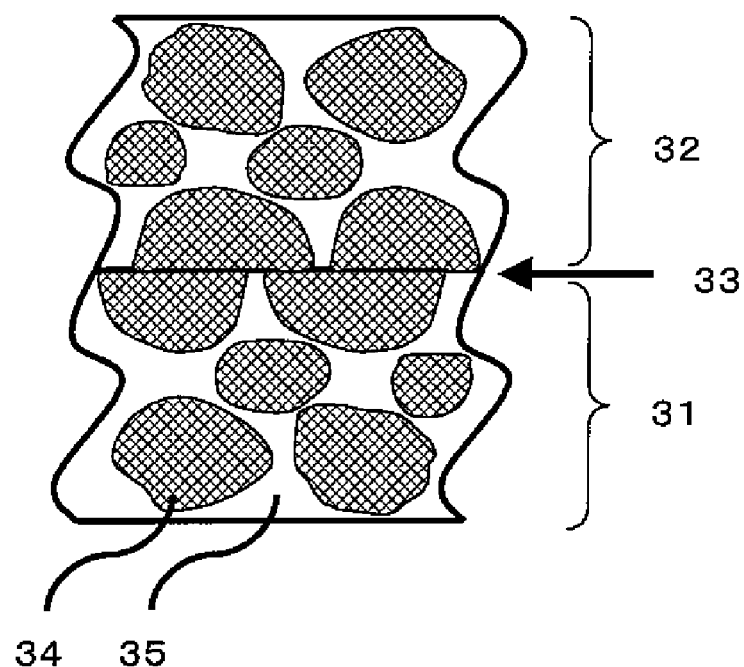
FIGS. 3(a) and 3(b) are enlarged schematic diagrams showing the vicinity of a bonding part of a composite ceramic body of the present invention.
Figure 3:
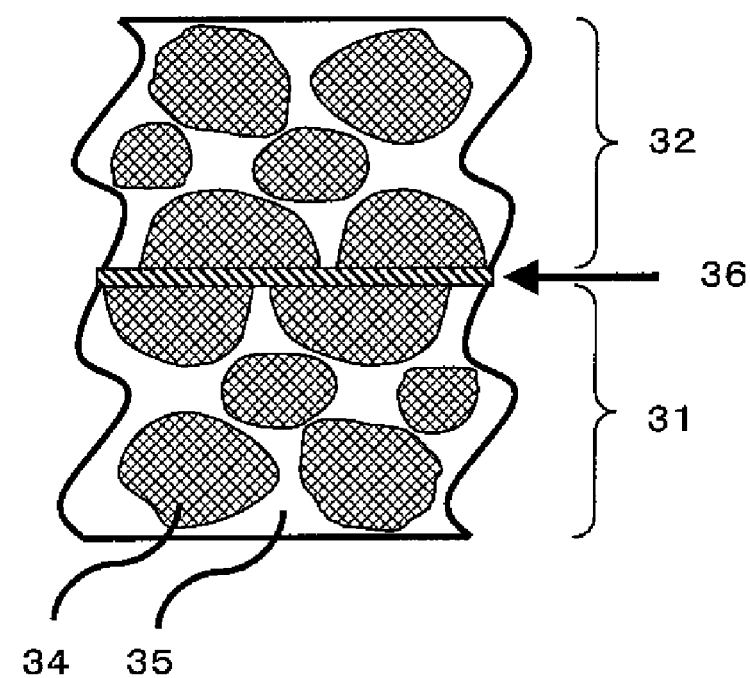

The above phenomenon will be described in more detail with reference to the accompanying drawings, taking as an example the case where the first bonding body 1 and the second bonding body 2 are composed of alumina ceramics. FIGS. 3(a) and 3(b) are enlarged schematic views showing the vicinity of the bonding part of the composite ceramic body according to the present embodiment.

A first bonding body 31 and a second bonding body 32 are subject to mirror-surface polishing work prior to bonding, so that the surfaces serving as bonding surfaces have a surface roughness Ra of 0.05 μm or less. On the mirror-surface polished surfaces of the first and second bonding bodies 31 and 32, alumina particles 34 as being main component are exposed, and a grain boundary glass layer 35 composed mainly of Si surrounds the alumina particles 34.

The two surfaces in this state are faced to each other and brought into a mechanically adhered state, as shown in FIG. 3(a), followed by heat treatment at high temperature. In the mechanically adhered state before heat treatment, the concentration of Si existing in the vicinity of a bonding surface 33 is lower than that in the inside of the first bonding body 31 and that in the inside of the second bonding body 32.

When heat treatment is conducted in this state at high temperature of 1000° C. to 1800° C., according to Fick's second law, the ingredient of the grain boundary glass layer 35 in the vicinity of the bonding surface of each of the first and second bonding bodies 31 and 32, which are composed of alumina ceramics, causes spreading diffusion to the bonding surfaces of the first and second bonding bodies 31 and 32, and a bonding material 36 can be formed as shown in FIG. 3(b). The main component of the grain boundary glass layer 35 is Si, and the diffusion occurs remarkably in the vicinity of the bonding surface 33 between the first and second bonding bodies 31 and 32. As a result, the concentration of Si in the vicinity of the bonding surface 33 in the first and second bonding bodies 31 and 32 is lowered than that in the inside. Thus, the Si ingredient is eluted onto the bonding surface 33, thereby forming the bonding material 36 composed mainly of a Si compound. The bonding material 36 relaxes thermal stress at the time of bonding, thus enabling suppression of fracture and crack in the bonding surface 33.

Since the bonding material 36 can be formed in this manner, the layer of the bonding interface between the first bonding body 1 and the second bonding body 2, as shown in FIG. 1, cannot be substantially observed. This enables the composite ceramic body 10 visually free from the bonding interface. The thickness of the bonding material 3 and the bonding interface as described above can be confirmed by an examination under a transmission electron microscope.

Preferably, the bonding material 3 between the first and second bonding bodies 1 and 2 is 200 nm or less. In the composite ceramic body 10 of the present invention, the bonding can be obtained by the elution of the Si ingredient contained in the first and second bonding bodies 1 and 2, and therefore the bonding material 3 is extremely thin as small as 200 nm or less, because adhesive prepared separately is not used. Preferably, the thickness of the bonding material 3 is 10 nm or more. The thickness of less than 10 nm may deteriorate the bonding strength.

More preferably, the bonding material 3 contains oxygen atoms besides the Si ingredient. By containing oxygen atoms, the viscosity of the Si ingredient can be lowered and bonding strength can be increased. Further, the thickness precision of the bonding material 3 can be increased, resulting in a good parallelism of the first and second bonding bodies 1 and 2.

Since the ingredient of the bonding material 3 is melt glass, the spacing between the first and second bonding bodies 1 and 2 (the space on atomic level) can be eliminated, and therefore high-level strength can be retained. Consequently, the presence of the bonding material 3 realizes excellent thermal properties at the bonding parts in the first and second bonding bodies 1 and 2 (namely, the use under high temperature environment).

Figure 4:
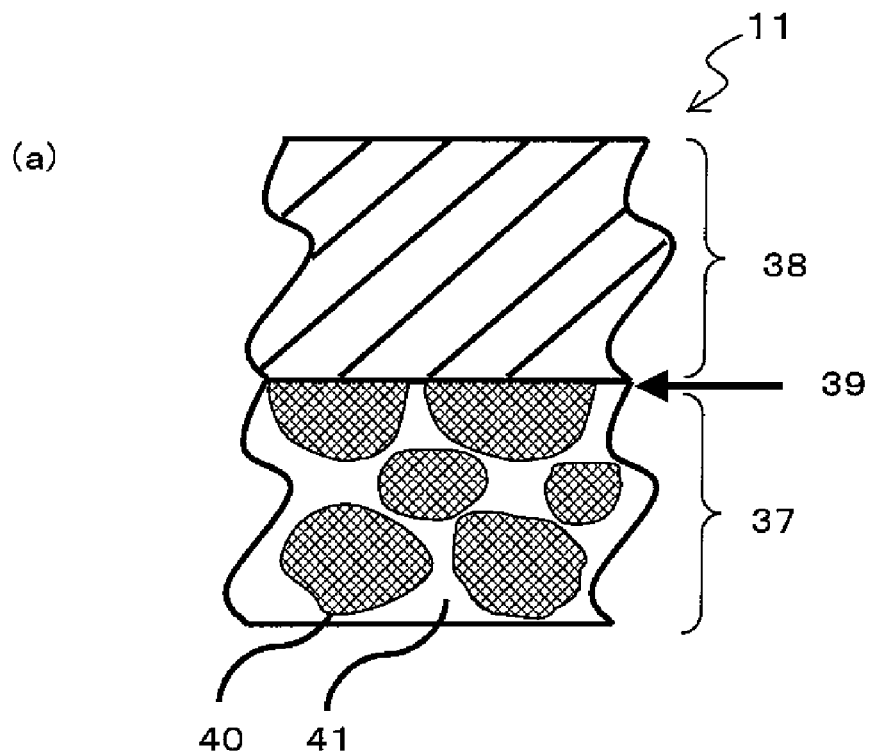
FIGS. 4(a) and 4(b) are enlarged schematic diagrams showing the vicinity of a bonding part of a composite ceramic body according to other embodiment of the present invention.
Figure 4:
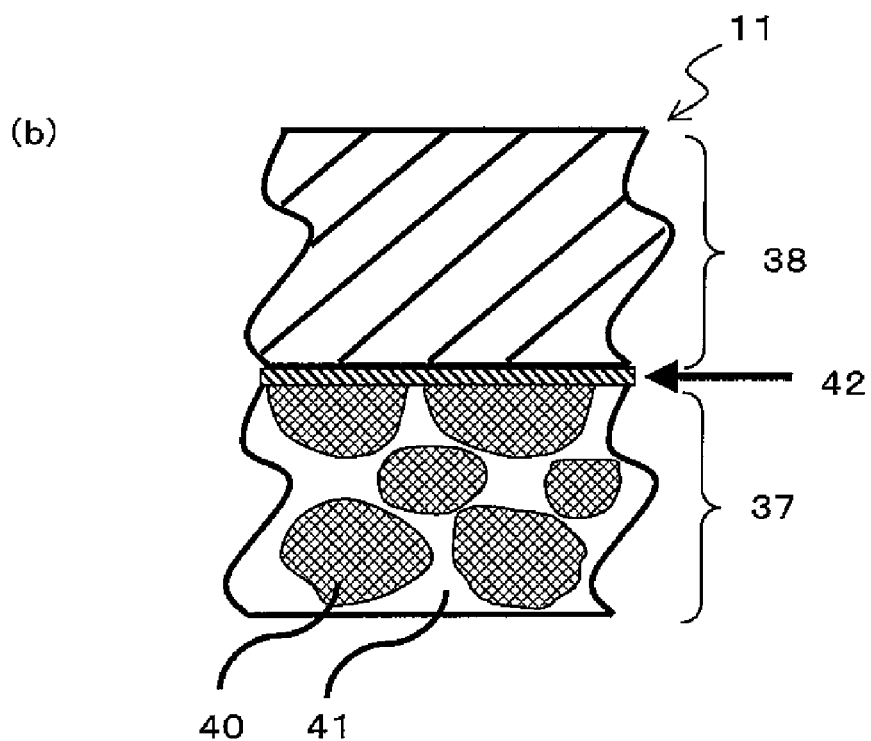

Next, other embodiment where the second bonding body is composed of sapphire will be described in detail with reference to the accompanying drawings. FIGS. 4(a) and 4(b) are enlarged schematic diagrams showing the vicinity of a bonding part of a composite ceramic body according to this embodiment.

In a first bonding body 37 and a second bonding body 38, the surfaces serving as bonding surfaces are subject to mirror-surface polishing work prior to bonding. On the mirror-surface polished surface of the first bonding body 37, alumina particles 40 as being main component are exposed, and a grain boundary glass layer 41 composed mainly of Si surrounds the alumina particles 40.

The two bonding surfaces 39 in this state are faced to each other, and the first and second bonding bodies 37 and 38 are mechanically adhered as shown in FIG. 4(a), followed by heat treatment at high temperature. In the mechanically adhered state before heat treatment, the concentration of Si existing in the vicinity of the adhered bonding surfaces 39 is lower than that in the inside of alumina ceramics.

When heat treatment is conducted in this state at high temperature of 1000° C. to 1800° C., according to Fick's second law, the ingredient of the grain boundary glass layer 41 within alumina ceramics causes spreading diffusion to the bonding interface between the first and second bonding bodies 37 and 38, and a bonding material 42 can be formed as shown in FIG. 4(b).

The main component of the grain boundary glass layer 41 is Si. In the diffusion, the Si in the vicinity of the surface of the first bonding body 37 moves toward the bonding surface 39. As a result, the concentration of Si in the vicinity of the bonding surface 39 of the first bonding body 37 is lowered than that in the inside of the bonding body 37.

Thus, in the vicinity of the bonding surface 39, Si diffuses as the bonding material 42. Therefore, the concentration of Si decreases toward the bonding surface, in comparison with that in the inside. At the same time, the bonding material 42 can be formed thereby to increase the bonding strength, and the bonding material 42 functions to relax thermal stress at the time of bonding, thus enabling suppression of fracture and crack in the bonding surface.

Figure 5:
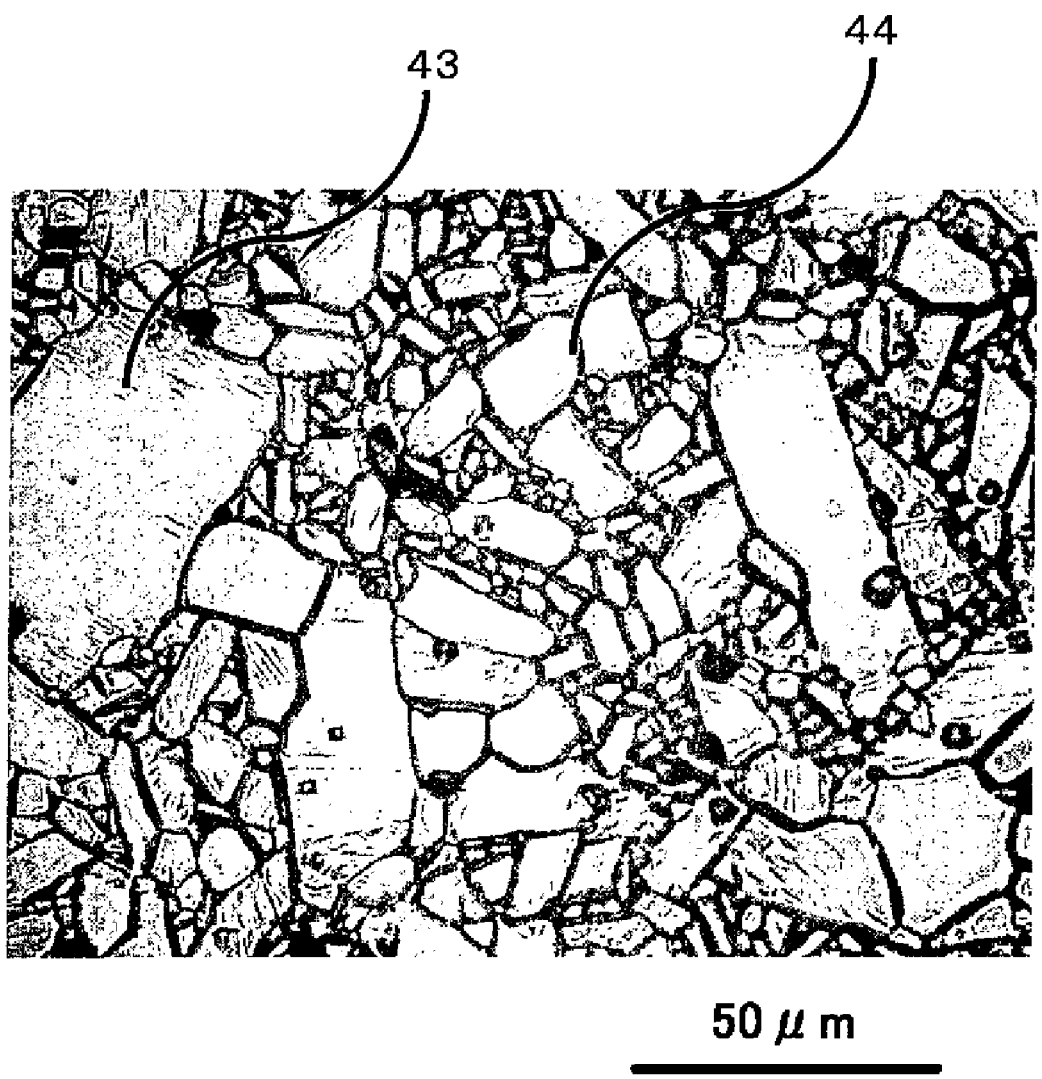
FIG. 5 is a photograph when a composite ceramic body of the present invention is examined microscopically from a second bonding body formed of sapphire.

FIG. 5 shows the situation when the bonding between the first bonding body 37 composed of alumina ceramics and the second bonding body 38 composed of sapphire is examined microscopically from the sapphire side. As shown in FIG. 5, transparent sapphire is bonded through a transparent bonding material on the polished surface of alumina ceramics as the first bonding body 37. Since the microphotograph was taken from the sapphire plane side, the alumina particles 43 of alumina ceramics and the grain boundary layer 44 can be seen through the sapphire and the bonding material.

When the second bonding body 2 is composed of sapphire, its high transparency and high thermal conductivity can be used for the application as an optical element.

Preferably, the bonding surface of the second bonding body 38 composed of sapphire is the c-plane. This causes less anisotropy in coefficient of thermal expansion than sapphire of other surface orientation. It is therefore possible to suppress separation, fracture, and crack due to a difference in coefficient of thermal expansion between the first bonding body 37 and the second bonding body 38.

Figure 6:
FIG. 6(a) is an atomic force microscope photograph of a step-terrace structure.
FIG. 6(b) is a schematic diagram showing schematically FIG. 6(a)
Figure 6:
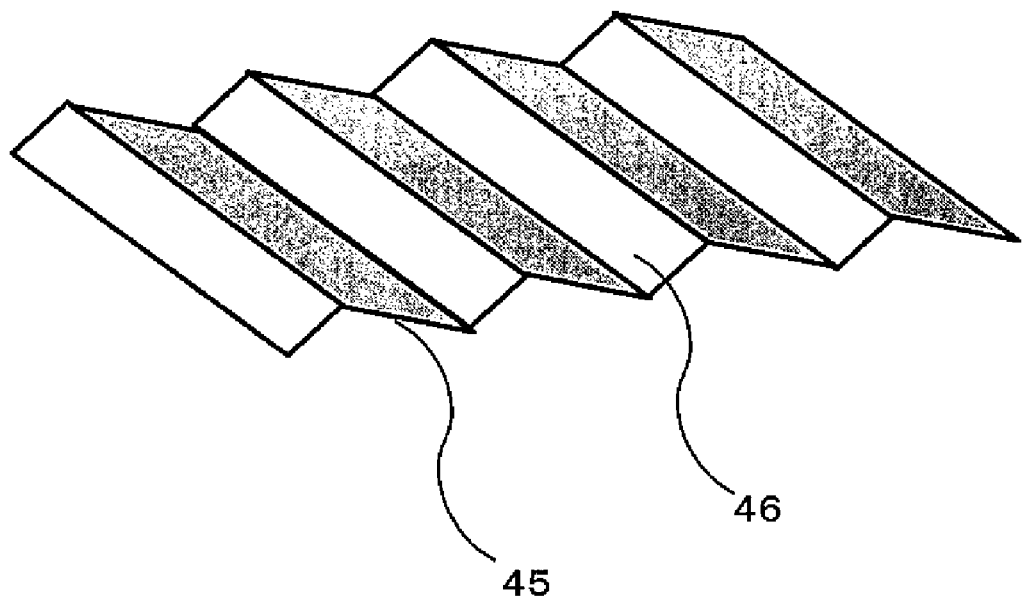

Further, when the second bonding body 38 is composed of sapphire, it is preferable that at least part of the bonding surface has a step-terrace structure. An example of the step-terrace structure is shown in FIGS. 6(a) and 6(b). That is, FIG. 6(a) is an atomic force microscope (AFM) photograph of the step-terrace structure that can be observed when a c-plane sapphire substrate is heat-treated in oxidizing atmosphere at 1000° C. for 3 hours, and shows a range where a side is 5 μm. FIG. 6(b) is a schematic diagram showing schematically FIG. 6(a), in which reference numeral 45 indicates a terrace part and reference numeral 46 indicates a step part.

When the step-terrace structure as shown in FIGS. 6(a) and 6(b) is formed on the bonding surface between the first and second bonding bodies, the surface area of the bonding surface can be increased and the adhesion to the bonding material can be improved thereby to increase the bonding strength.

More preferably, the step-terrace structure has a step height h of 0.2 nm or more. This mechanism can be estimated as follows. That is, when a sapphire substrate having a specific crystal plane as a surface is heat-treated in air, it is possible to obtain a terrace surface having extremely flat and identical crystal orientation, and a substrate surface having a linear regular step site. By optimizing the heat treatment temperature and time, the atoms in the sapphire substrate surface can be rearranged so as to have an extremely flat surface. For example, when the c-plane sapphire substrate is heat-treated at 1000° C. for 10 hours, the step-terrace structure having a step height of approximately 0.2 nm can be formed.

This is because when the sapphire substrate is heated in air, aluminum atoms and oxygen atoms in the sapphire surface move in the sapphire surface by thermal energy, thus leading to rearrangement thereof. That is, the atoms with thermal energy move about in the sapphire surface, and they are then trapped at the most stable position, thereby forming a step having a dimension of atomic level.

Accordingly, if the heat treatment temperature is about 1000° C., aluminum atoms and oxygen atoms can receive thermal energy, and they try to release from the crystal and move about freely. However, they are constrained by the potential of the sapphire substrate surface, and move and diffuse in two-dimension over the sapphire substrate surface. As a result, they are accommodated at the stable position, thereby forming a smooth surface.

However, when the heat treatment temperature is further raised, for example at 1150° C., and heat treatment is carried out for 3 hours, a step-terrace structure can be formed. However, there will occur the phenomenon called bunching where the step height is increased as large as approximately 1 nm. That is, when the heat treatment temperature is 1150° C. or more, the thermal energy of the aluminum atoms and oxygen atoms exceeds the potential energy of the sapphire substrate surface, and the action of releasing from the sapphire substrate surface is dominant. As a result, the action that the aluminum atoms and oxygen atoms are released randomly from the sapphire substrate is dominant than the action of smoothing the sapphire substrate surface. This causes the phenomenon that the sapphire substrate surface is deteriorated in surface roughness.

This is the phenomenon called bunching, and becomes significant at temperatures of 1100° C. or more. There is a tendency that the bunching occurs further vigorously and the step height increases as the heat treatment temperature is further raised.

Based on the above principle, in order that the second bonding body 38 composed of sapphire has the step-terrace structure in the composite ceramic body 11, it is preferable to control the heat treatment temperature for bonding the first bonding body 37 and the second bonding body 38 to 1100° C. or more. In this case, the aluminum atoms and the oxygen atoms released from the second bonding body 38 composed of sapphire can diffuse to the first bonding body 37, whereas $SiO_2$ ingredient is deposited from the first bonding body 37 and then diffuses to the bonding body 38. As a result, a bonding material of about 200 nm, in which $SiO_2$ and aluminum atoms and oxygen atoms are mixed together and bonded strongly, can be formed between the two bodies, thus leading to the step-terrace structure exhibiting strong bonding.

<Manufacturing Method>

[First Manufacturing Method]

A first method of manufacturing a composite ceramic body according to the present invention will be described below. The description will be made of the composite ceramic body 11 where the respective bonding bodies are the first bonding body 37 composed of alumina ceramics and the second bonding body 38 composed of sapphire, as above described.

Firstly, raw material powder of alumina ($Al_2O_3$), sintering additive powder such as silicon oxide ($SiO_2$), magnesium oxide (MgO), calcium oxide (CaO), and suitable organic binder, organic solvent, plasticizer, and dispersing agent are added and mixed together to obtain a slurry state. This is then formed in a sheet-shape by well-known doctor blade method or the like, thereby obtaining a plurality of ceramic green sheets. Preferably, silicon oxide ($SiO_2$) is contained 0.1 to 15 weight % with respect to the total amount of alumina ($Al_2O_3$).

Then, ceramic substrates serving as the first bonding body 37 are formed by green sheet laminating method which includes: processing the ceramic green sheets in a predetermined dimension and a shape; laminating the resulting sheets; and sintering at about 1600° C. Sapphire substrates serving as the second bonding body 38 to be bonded to the first bonding body 37 are processed in a predetermined dimension and a shape by cutting or the like.

Next, at least the surfaces used as bonding surfaces of the first bonding body 37 and the second bonding body 38 are polished, respectively. Preferably, the bonding surface of the ceramic substrate is polished so as to have an arithmetic mean surface roughness Ra of 0.3 μm or less, preferably 0.2 μm or less, by using, for example, a lap polishing machine which includes polishing with diamond abrasive grains, and buff polishing. Specifically, a desired arithmetic mean roughness Ra can be obtained in the following manner with a general flat lap polishing machine, which includes firstly rough polishing with the diamond abrasive grains having a mean particle size of 30 μm to 50 μm, then polishing with diamond abrasive grains having a mean particle size of a several μm, and finally buff polishing with diamond abrasive grains having a mean particle size of 1 μm or less. In this case, a suitable polishing speed is 2000 to 2500 rpm.

Preferably, the bonding surface of the sapphire substrate is also polished so as to have an arithmetic mean roughness Ra of 0.08 μm or less, in the same manner as in the above-mentioned ceramic substrate, namely polishing with the diamond abrasive grains and the buff polishing. The arithmetic mean roughness Ra is based on the standard of JIS B0601-2001 (according to ISO4287-1997).

Thus, the flat bonding surfaces can be obtained, and the ceramic substrate can have the surface where the alumina ceramics grains are arranged at random, and in the grain boundaries of these, glass ingredients composed of $SiO_2$, MgO, and CaO are arranged in a mesh.

In order to bring the first and second bonding bodies 37 and 38 into contact with each other, a heavy load such as a molybdenum (Mo) plate or other ceramic plate is placed on an assembly in which the ceramic substrate and the sapphire substrate are disposed so that their respective bonding surfaces are faced to each other. Thus, both can be pressed so that the bonding surfaces can be adhered to each other. At this time, the pressing force is preferably 195 to 500 Pa, more preferably 245 to 440 Pa.

The second bonding body 38 (the sapphire substrate) is bonded through a bonding material composed mainly of a Si compound eluted from the first bonding body 37 (the ceramic substrate) by performing the following heat treatment. That is, in order to protect the first and second bonding bodies 37 and 38 against thermal shock, these are heated within a furnace from ordinary temperature, and retained at a temperature of about 1350 to 1450° C. for about 30 minutes to 1 hour, followed by annealing to ordinary temperature.

The above heat treatment temperature is preferably lower than the sintering temperature of the first and second bonding bodies 37 and 38. However, because the second bonding body 38 is composed of sapphire in this example, it is preferable to perform the heat treatment at a temperature lower than the sintering temperature of the first bonding body 37. On the other hand, when the second bonding body 38 comprising a ceramic containing Si ingredient, the above-mentioned heat treatment temperature is preferably lower than the sintering temperature of the first and second bonding bodies 37 and 38, as previously described. In such a temperature range, the sintering of the ceramic substrate cannot be advanced further, and the glass ingredient arranged between the ceramic particles can be moved easily. This glass ingredient enables the first and second bonding bodies 37 and 38 to be bonded strongly, resulting in the composite ceramic body having neither warping nor shrinkage.

The bonding material 3 composed of the glass ingredient having an extremely small thickness of 200 nm or less effects bonding between the ceramic particles and the sapphire substrate. Additionally, in the area of the mesh-shaped glass ingredient disposed in the ceramic grain boundary, the mesh-shaped glass ingredient having a large thickness can be located to cause a large area bonding. Hence, the composite ceramic body 11 can exhibit strong bonding force against such external force as to separate the two bonding bodies.

While the foregoing embodiment has described the case where the second bonding body is composed of sapphire, without limiting to this, the first manufacturing method is applicable to the case of being composed of a material other than sapphire and not containing Si ingredient, or the case where no sapphire is contained and the second bonding body comprising a ceramic containing Si ingredient.

[Second Manufacturing Method]

A second method of manufacturing a composite ceramic body according to the present invention will next be described. The description is made of the composite ceramic body 10 where the respective bonding bodies are a first bonding body 1 composed of alumina ceramics and a second bonding body 2 composed of alumina ceramics.

In this manufacturing method, the first bonding body 1 and the second bonding body 2 are firstly prepared. At least one of bonding surfaces of the first and second bonding bodies 1 and 2 is subject to hydrophilization process with a liquid having OH groups. The hydrophilization process is preferably carried out on each surface of the first and second bonding bodies 1 and 2, in order to obtain high bonding strength. Examples of the liquid having OH groups are water, alcohols such as ethyl alcohol and methyl alcohol, sodium hydroxide, and potassium hydroxide. Among others, water or alcohols such as ethyl alcohol is preferred from the viewpoint of operability. As a method of the hydrophilization process, there are, for example, spraying such as atomization, painting, and dipping.

In this manufacturing method, it is preferable to perform polishing before the hydrophilization process onto the surfaces of the first bonding body 1 and the second bonding body 2. It is also preferable that the arithmetic mean roughness Ra after polishing is 0.02 µm or less, or the flatness is 0.50 µm or less, because this increases the adhesion when the first and second bonding bodies 1 and 2 are brought into contact with each other.

The hydrophilization-processed first and second bonding bodies 1 and 2 are then brought into contact with each other. At this time, there is no need to apply any pressure. If positional precision is required, a jig or the like necessary for that may be prepared.

Then, heat treatment is carried out at 1000 to 1800° C. Depending on the characteristic of a used material, the heat treatment is carried out, for example, in atmosphere, oxidizing atmosphere, reducing atmosphere, or vacuum atmosphere. Under a heat treatment temperature of 1000 to 1800° C., the elution of Si ingredient contained in the first bonding body 1 onto the bonding surface can be facilitated, thus exhibiting high bonding strength. Further, the crystallization of the Si ingredient eluted onto the bonding surface can be prevented to increase sufficiently the wettability of the first and second bonding bodies 1 and 2, thus leading to higher bonging strength.

On the contrary, the heat treatment temperature of below 1000° C. makes it difficult for the Si ingredient contained in the first bonding body 1 to elute onto the bonding surface. Exceeding 1800° C., the Si ingredient eluted on the bonding surface is crystallized, failing to sufficiently wet the first and second bonding bodies 1 and 2.

It is further required that the above-mentioned heat treatment temperature is lower than the sintering temperature of the first and second bonding bodies 1 and 2. This is for preventing that the sintering of the bonding bodies is excessively advanced and then deformed by heat treatment at a temperature higher than the sintering temperature. In the case where the second bonding body is sapphire, no sintering temperature is present, and therefore only the sintering temperature of the first bonding body corresponds to the above-mentioned heat treatment temperature.

The above manufacturing method eliminates the necessity to form, prior to bonding, a ingredient serving as the bonding material 3, making it easy to obtain the composite ceramic body 10. Additionally, the bonding material 3 can be formed in an extremely small thickness, thus achieving the composite ceramic body 10 with a hard-to-observe bonding interface.

While the foregoing embodiment has described the case where the second bonding body is composed of alumina ceramics, without limiting to this, the second manufacturing method is suitably applicable to, for example, the case of using sapphire in addition to alumina ceramics, or the case where the second bonding body is composed of sapphire.

In the first and second manufacturing methods, it is more preferable that not only the first bonding body 1 but also the second bonding body contains Si ingredient, because the bonding strength can be increased.

Although the foregoing embodiment has described the case of having the two bonding bodies, namely the first and second bonding bodies, without limiting to a pair of bonding bodies, three or more bonding bodies may be used. In this case, an arbitrary bonding body is used as the first bonding body 1, and either of the adjacent bonding bodies may be used as the second bonding body 2.

Although the foregoing embodiment has described the case where the bonding material is the ingredient eluted from the first bonding body, the bonding material in the present invention may be one composed mainly of a Si compound containing the same element as the Si ingredient contained in the first bonding body. A bonding material so composed may be applied, for example, to the bonding surface of the first bonding body so as to bond the first and second bonding bodies.

The composite ceramic body of the present invention thus obtained can be used suitably as a substrate for a microchemical chip or a substrate for a reformer for reforming fuel. The cases where the composite ceramic body 10 provided with the above-mentioned first and second bonding bodies 1 and 2 is used as a microchemical chip and a reformer, respectively, will be described in detail with reference to the accompanying drawings.

<Microchemical Chip>

Figure 7:
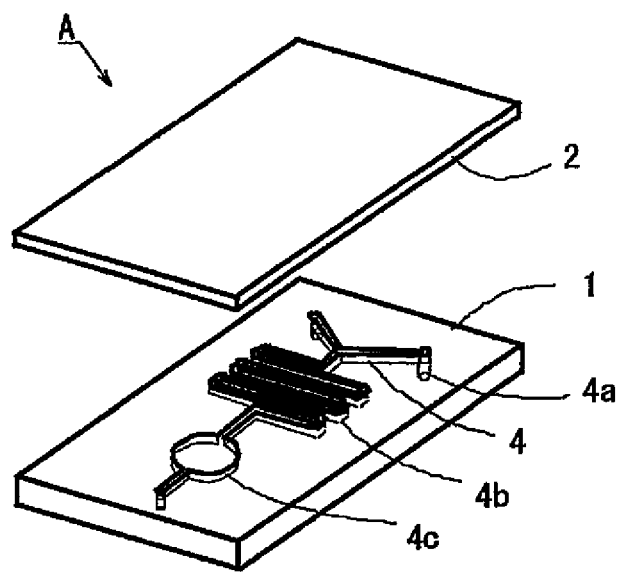
FIG. 7 is a perspective assembly drawing showing an example of a microchemical chip using a composite ceramic body of the present invention.

FIG. 7 is an assembly perspective view showing an example of a microchemical chip according to the present invention. A microchemical chip A has a channel 4 on the bonding surface of either the first bonding body 1 or the second bonding body 2. More specifically, the microchemical chip A includes the first bonding body 1 having the channel 4 on the surface thereof, and the second bonding body 2 bonded, through a Si compound eluted from the first bonding body 1, to the surface of the first bonding body 1 located in the periphery of the channel 4.

The microchemical chip A can be manufactured in the following manner. That is, a raw ceramic formed body is obtained by a proper stamping for forming a channel 4 on a ceramic green sheet, and laminating this on other ceramic green sheet serving as the bottom surface of the channel 4, or by pressing a mold prepared for enabling the channel 4 to be formed by press working, on the surface of an unsintered raw ceramic body. The raw ceramic formed body is then sintered at a predetermined temperature to form a first bonding body 1. Subsequently, polishing is carried out on the surface of the bonding surface of the first bonding body 1 on which the channel 4 is formed. Similarly, the bonding surface of the second bonding body 2 is polished. The bonding surface of the first bonding body 1 and the bonding surface of the bonding body 2 are brought into contact with each other, followed by a predetermined heat treatment.

The microchemical chip A has an inlet 4a, a curved part 4b, and a storing part 4c. A sample introduced from the inlet 4a, which is formed on the bottom surface of the first bonding body 1, is mixed at the curved part 4b, and the obtained reaction product is stored in the storing part 4c. When the second bonding body 2 is composed of sapphire or the like, by disposing the inlet 4a in the first bonding body 1 comprising a ceramic, the working can be facilitated. The microchemical chip A is not limited to that shown in FIG. 7, and the channel 4 can be arranged by disposing a required element depending on the necessary chemical reaction.

The side surface of a through-hole obtained by stamping the ceramic green sheet has an arithmetic mean roughness Ra of about 1 to 5 µm, and this surface roughness hardly impairs the flowability of a liquid passing through the channel 4. That is, it has been confirmed that the flow of the liquid can maintain a viscous flow.

Although the above method of manufacturing the microchemical chip A has described the case where it is formed by two ceramic green sheets, namely the ceramic green sheet for forming the channel 4 of the first bonding body 1, and the ceramic green sheet used as the bottom, the present invention is not limited to this. The microchemical chip A may be formed of three or more ceramic green sheets. For example, it may be provided with a three dimensional channel 4 by forming a punching part serving as the channel 4 on two or more ceramic green sheets, respectively, and forming throughholes for the respective channels 4 formed in the different ceramic green sheets.

As described above, because the first and second bonding bodies 1 and 2 are bonded through the bonding material composed of the Si compound contained in the first bonding body 1, the extremely thin and uniform bonding material 3 is attainable, and therefore there is little overflow of the bonding material 3 into the channel 4. This realizes the microchemical chip A capable of providing high-precision chemical reaction and a stable yield of a reaction product.

Even if the liquid within the channel 4 is an extremely corrosive liquid such as strong acid or strong alkali, the materials of the first and second bonding bodies 1 and 2 are extremely protective against corrosion, and the bonding material 3 is extremely thin and hence a corrosive liquid is hard to penetrate into the bonding material 3. Accordingly, there is little or no corrosion of the first and second bonding bodies. Therefore, there is no risk that these are eluted as impurities into the reaction product, enabling a high purity reaction product to be obtained.

Further, in the microchemical chip A of the present invention, the precision channel 4 can be formed by a simple manufacturing process without performing any complicated processing such as etching process. Hence, the microchemical chip A has high productivity and is inexpensive. Since ceramics has superior chemical resistance and higher strength than resin, a thin microchemical chip A is attainable.

Furthermore, when the second bonding body 2 is composed of sapphire, the sapphire has excellent permeability of electromagnetic wave of a wide frequency band including light, the microchemical chip A can be adapted to induce a chemical reaction due to ultraviolet or the like in the channel 4. Alternatively, the microchemical chip A can be adapted to measure an optical absorption spectrum in the channel 4, and can test the component of the reaction product.

<Reformer>

Figure 8:
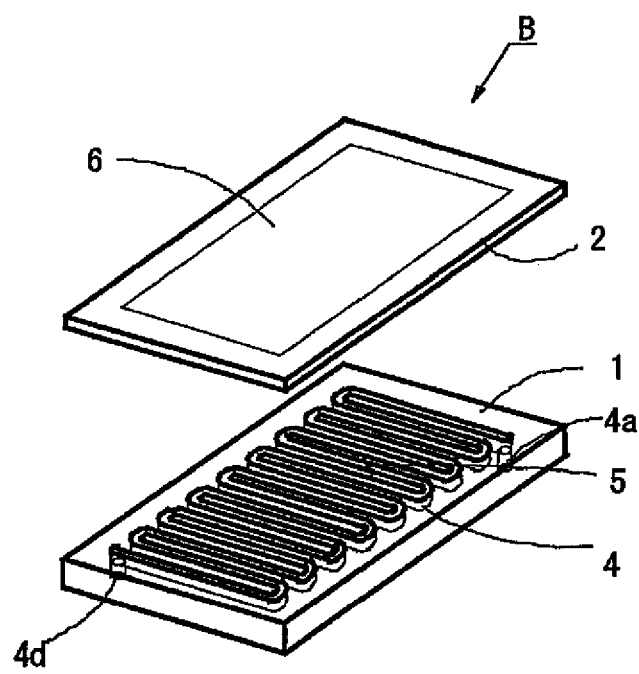
FIG. 8 is a perspective assembly drawing showing an example of a reformer using a composite ceramic body of the present invention.
Figure 9:
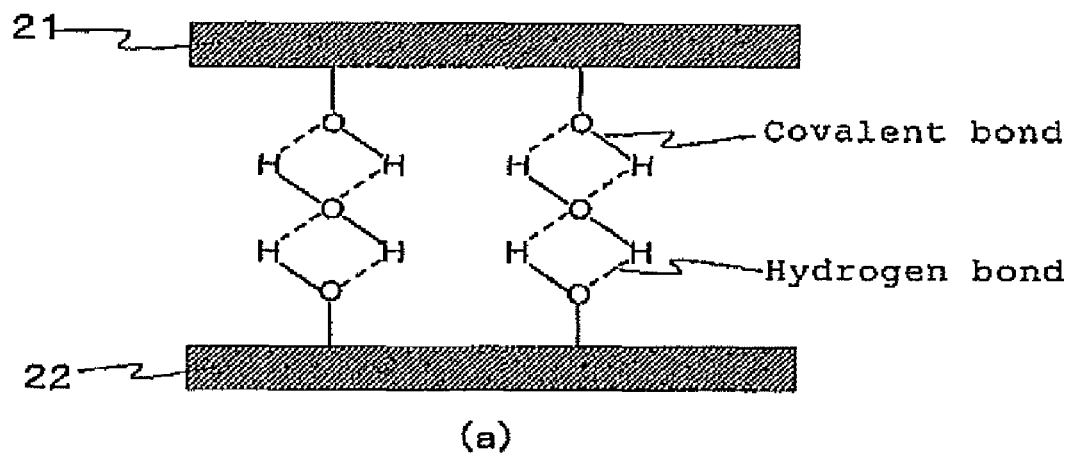
FIGS. 9(a) to 9(c) are explanatory drawings showing the principle of direct bonding in a composite ceramic body of related art.
Figure 9:
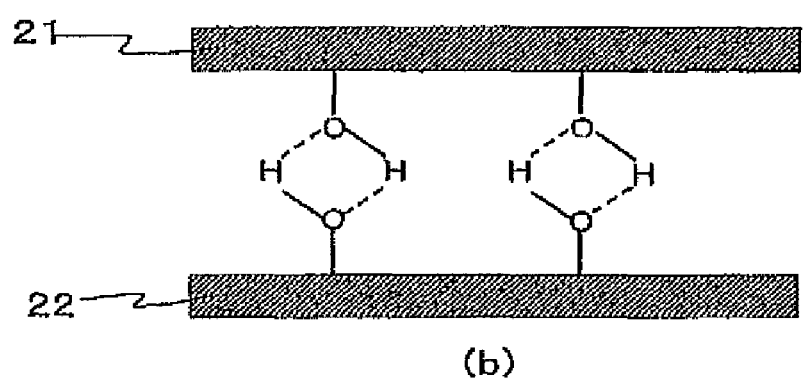
Figure 9:
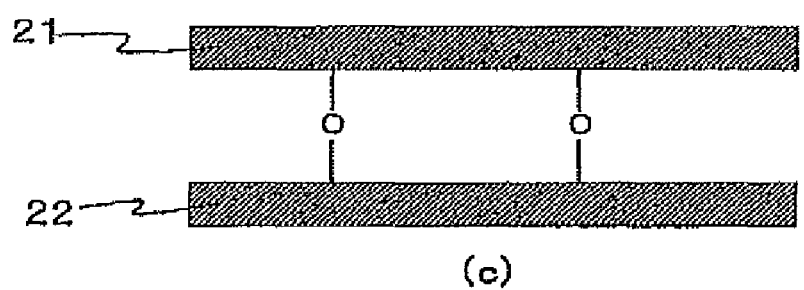

FIG. 8 is an assembly perspective view showing an example of a reformer according to the present invention. A connecting line for connecting a heating element 6 to a power circuit, and the like are omitted.

As shown in FIG. 8, the composite ceramic body 10 of the present invention can be used effectively as a reformer B. Specifically, the reformer B is provided with a channel 4 having a catalyst layer 5, and a heating element 6 for heating the catalyst layer 5. The channel 4 is disposed on at least a part of the surface of the bonding surface in the first bonding body 1 or the second bonding body 2.

More specifically, the reformer B is constructed of a first bonding body 1 having on the surface thereof the channel 4, the catalyst layer 5 being formed at least in part of the channel 4, and the second bonding body 2 bonded to the surface of the first bonding body 1 through a Si compound eluted from the first bonding body 1. Further, the heating element 6 for heating the catalyst layer 5 is disposed in the inside, the surface, or the outside of the composite ceramic body 10.

In the above reformer B, the catalyst layer 5 composed of platinum or the like is heated to a predetermined temperature by the heating element 6, and a fluid containing hydrogen such as methyl alcohol is passed through the inlet 4a disposed on the bottom surface of the first bonding body 1 to the channel 4 of the reformer B, so that the methyl alcohol can be decomposed to generate hydrogen and then discharged from the outlet 4d.

The reformer B of the present invention may be manufactured in the same manner as in the foregoing microchemical chip A. Like the microchemical chip A, the reformer B is capable of conducting a precise chemical reaction, and has characteristics such as excellent chemical resistance. Otherwise, the configuration is identical to that described with respect to the microchemical chip A. The description thereof is therefore emitted.

When the second bonding body 2 is composed of sapphire, because sapphire is material having excellent thermal conductivity, it is possible to achieve the reformer B enabling efficient heating of the catalyst 5 through sapphire. Since the composite ceramic body 10 of the present invention has high heat resistance, it is easy to realize the reformer B for conducting a chemical reaction in the catalyst layer 5 by arranging a plurality of the reformers B, and heating the whole of the plurality of the reformers B by the heating elements 6 from the outside of the reformers B. As a specific application, there is a methyl alcohol reformer for forming hydrogen, and the like.

Although the above description is made of the reformer B where at least one of the bonding surfaces of the first and second bonding bodies is provided with the channel having the catalyst layer, and the heating element for heating the catalyst layer, the reformer according to the present invention may have the configuration that each of the bonding surfaces of the first and second bonding bodies is provided with the channel having the catalyst layer, and the heating element for heating the catalyst layer.

The present invention will be described in more detail with reference to the following examples, but it is to be understood that these are not intended to be limiting of the present invention.

EXAMPLES 1 TO 6

<Manufacture of Composite Ceramic Bodies>

Composite ceramic bodies of Examples 1 to 6 were manufactured by using first and second bonding bodies in the combinations as shown in Table 1, respectively.

Specifically, the first and second bonding bodies shown in Table 1 were prepared, and the surfaces of the first and second bonding bodies were subject to polishing work (mirror-surface polishing work) by using a polishing tool or the like. Both had an after-working shape so that length, width and height were respectively 30 mm, 30 mm and 0.3 mm.

After the polishing work (the mirror-surface polishing work), the surfaces of the first and second bonding bodies were subject to hydrophilization process. The hydrophilization process was carried out by alkali cleaning using potassium hydroxide. The first and second bonding bodies were brought into contact with each other, and in this state, these were heat-treated in oxidizing atmosphere under the heat treatment conditions as shown in Table 1, thereby obtaining the composite ceramic bodies of Examples 1 to 6.

The surface roughness (Ra) of the first and second bonding bodies after the polishing work, and the flatness (μm) after the polishing work are shown in Table 1. The surface roughness (Ra) values were obtained by measuring the surfaces of the first and second bonding bodies after the polishing work, by an instrument (product name: SURFCOM-1400A) manufactured by Tokyo Seimitsu Co., Ltd. The flatness values were obtained by measuring the surfaces of the first and second bonding bodies after the polishing work, by a non-contact type measuring instrument. The surface roughness and flatness of these were obtained by measuring the surface where the first and second bonding bodies were to be bonded to each other.

TABLE 1

|  |  | Material | Surface roughness (Ra) after the polishing work (μm) | Flatness after the polishing work (μm) | Heat treatment condition Temperature (° C.) × Hour (Hr) |
|---|---|---|---|---|---|
| Example 1 | First bonding body | Alumina Ceramics | 0.020 | 0.50 | 1700 × 40 |
|  | Second bonding body | Lithium Tantalate (Single crystal) | 0.015 | 0.35 |  |
| Example 2 | First bonding body | Cordierite Ceramics | 0.018 | 0.41 | 1200 × 28 |
|  | Second bonding body | Crystal (Single crystal) | 0.010 | 0.39 |  |
| Example 3 | First bonding body | Forsterite Ceramics | 0.015 | 0.48 | 1150 × 20 |
|  | Second bonding body | Sapphire (Single crystal) | 0.012 | 0.35 |  |
| Example 4 | First bonding body | Steatite Ceramics | 0.019 | 0.44 | 1100 × 26 |
|  | Second bonding body | Alumina Ceramics | 0.020 | 0.50 |  |
| Example 5 | First bonding body | Alumina Ceramics | 0.020 | 0.50 | 1000 × 7 |
|  | Second bonding body | Oxygen Free Copper | 0.008 | 0.38 |  |
| Example 6 | First bonding body | Alumina Ceramics | 0.017 | 0.46 | 1800 × 38 |
|  | Second bonding body | Alumina Ceramics | 0.017 | 0.46 |  |

Evaluations

The area of defects in the bonding parts of the above composite ceramic bodies of Examples 1 to 6 were confirmed by using ultrasonic method. Specifically, a probe used in the ultrasonic method had a depth of focus of 25 mm. The frequency of ultrasonic emitted from a pulse generator through the probe to each of the composite ceramic bodies was set to 10 MHz. The composite ceramic bodies were immersed in water in advance, and ultrasonic was admitted from an arbitrary bonding body side, and a reflected wave generated from the bonding part was detected to form a reflected image at a magnification of 1.5 times. The defect parts correspond to the white parts observed in the reflected image.

Separately, composite ceramic bodies were manufactured in the combinations of bonding bodies shown in Table 1, by changing the area to that having two dimensions of 2 mm by 2 mm, instead of 30 mm by 30 mm. The first or second bonding body was fixed to a jig, and each of the composite ceramic bodies was pulled at a speed of 0.5 mm/sec from the back of the layer located on the opposite side. The necessary force for separating the first and second bonding bodies was measured by a load cell, and the peel strength was calculated.

The thickness of each of the bonding materials of Examples 1 to 6 was confirmed at a magnification of 100000 times under a transmission electron microscope.

The results of the foregoing evaluations are shown together in Table 2.

As apparent from Table 2, because Examples 1 to 6 were bonded by the Si ingredient eluted from the first or second bonding body, without through any adhesive prepared in advance, the white parts (defects) immediately after bonding were observed only at the edge portion of the bonding surface. From this result, it can be said that the composite ceramic bodies of the present invention have a small area of defect parts in ultrasonic flaw, and bonding is obtained nearly throughout the bonding surface, as well as high peel strength and high bonding strength. It can also be seen that it is able to obtain the bonding bodies having an extremely thin intermediate layer and a hard-to-observe bonding interface.

The invention claimed is:
1. A composite ceramic body comprising:
   a first bonding body comprising a ceramic containing Si ingredient, and
   a second bonding body bonded to the first bonding body through a bonding material containing, as main ingredient, a Si compound which includes the element common to the Si ingredient contained in the first bonding body,
   wherein the second bonding body comprises c-plane sapphire and at least part of the bonding surface of the second bonding body comprising c-plane sapphire has a step-terrace structure.
2. A composite ceramic body comprising:
   a first bonding body comprising a ceramic containing Si ingredient, and

TABLE 2

|  |  | Material | White part area immediately bonding ($cm^2$) | Peel strength (N/mm) | Thickness of bonding material (nm) |
|---|---|---|---|---|---|
| Example 1 | First bonding body | Alumina Ceramics | 0.16 | 18.3 | 70 |
|  | Second bonding body | Lithium Tantalate (Single crystal) |  |  |  |
| Example 2 | First bonding body | Cordierite Ceramics | 0.12 | 20.2 | 110 |
|  | Second bonding body | Crystal (Single crystal) |  |  |  |
| Example 3 | First bonding body | Forsterite Ceramics | 0.17 | 22.0 | 130 |
|  | Second bonding body | Sapphire (Single crystal) |  |  |  |
| Example 4 | First bonding body | Steatite Ceramics | 0.06 | 28.5 | 170 |
|  | Second bonding body | Alumina Ceramics |  |  |  |
| Example 5 | First bonding body | Alumina Ceramics | 0.20 | 15.2 | 20 |
|  | Second bonding body | Oxygen Free Copper |  |  |  |
| Example 6 | First bonding body | Alumina Ceramics | 0.08 | 26.1 | 50 |
|  | Second bonding body | Alumina Ceramics |  |  |  | a second bonding body bonded to the first bonding body through a bonding material containing, as main ingredient, a Si compound which includes the element common to the Si ingredient contained in the first bonding body, wherein the second bonding body comprises c-plane sapphire and at least part of the bonding surface of the second bonding body comprising c-plane sapphire has a step-terrace structure, and wherein a step height of the step-terrace structure is 0.2 nm or more.

* * * * *